(12) United States Patent
Gu et al.

(10) Patent No.: US 12,371,390 B2
(45) Date of Patent: Jul. 29, 2025

(54) MODIFIED CALCIUM SILICATE BOARD AND SURFACE TREATMENT METHOD AND APPLICATION THEREOF

(71) Applicant: JIANGSU LONGING NEW MATERIAL TECHNOLOGY CO., LTD, Jiangsu (CN)

(72) Inventors: Haibing Gu, Jiangsu (CN); Yongping Ding, Jiangsu (CN)

(73) Assignee: JIANGSU LONGING NEW MATERIAL TECHNOLOGY CO., LTD, Yixing (CN)

( * ) Notice: Subject to any disclaimer, the term of this patent is extended or adjusted under 35 U.S.C. 154(b) by 915 days.

(21) Appl. No.: 17/614,516

(22) PCT Filed: Oct. 29, 2021

(86) PCT No.: PCT/CN2021/127223
§ 371 (c)(1),
(2) Date: Nov. 27, 2021

(87) PCT Pub. No.: WO2022/100453
PCT Pub. Date: May 19, 2022

(65) Prior Publication Data
US 2022/0348512 A1    Nov. 3, 2022

(30) Foreign Application Priority Data

Nov. 11, 2020    (CN) .......................... 202011251691.4

(51) Int. Cl.

| | | |
|---|---|---|
| *C04B 41/52* | (2006.01) |
| *B05D 1/38* | (2006.01) |
| *B05D 3/02* | (2006.01) |
| *B05D 7/00* | (2006.01) |
| *B32B 7/12* | (2006.01) |
| *B32B 9/00* | (2006.01) |
| *B32B 9/04* | (2006.01) |
| *B32B 9/06* | (2006.01) |
| *B32B 21/04* | (2006.01) |
| *B32B 21/14* | (2006.01) |
| *B32B 29/00* | (2006.01) |
| *B32B 33/00* | (2006.01) |
| *B32B 37/06* | (2006.01) |
| *B32B 37/08* | (2006.01) |
| *B32B 37/10* | (2006.01) |
| *B32B 37/12* | (2006.01) |
| *C04B 28/18* | (2006.01) |
| *C04B 41/00* | (2006.01) |
| *C04B 41/45* | (2006.01) |
| *C04B 41/48* | (2006.01) |
| *C04B 41/50* | (2006.01) |
| *C04B 41/63* | (2006.01) |
| *C04B 41/68* | (2006.01) |
| *C04B 41/71* | (2006.01) |
| *C04B 111/00* | (2006.01) |

(52) U.S. Cl.
CPC .............. *C04B 41/524* (2013.01); *B32B 7/12* (2013.01); *B32B 9/042* (2013.01); *B32B 9/06* (2013.01); *B32B 21/14* (2013.01); *C04B 28/18* (2013.01); *C04B 41/457* (2013.01); *C04B 41/4853* (2013.01); *C04B 41/5089* (2013.01); *C04B 41/63* (2013.01); *C04B 41/68* (2013.01); *C04B 41/71* (2013.01); *B32B 2255/20* (2013.01); *B32B 2260/028* (2013.01); *B32B 2260/046* (2013.01); *B32B 2307/3065* (2013.01); *C04B 2111/00612* (2013.01); *C04B 2201/20* (2013.01)

(58) Field of Classification Search
None
See application file for complete search history.

(56) References Cited

FOREIGN PATENT DOCUMENTS

| CN | 105859323 A | | 8/2016 | |
|---|---|---|---|---|
| CN | 111823692 A | * | 10/2020 | |
| EP | 2487042 A1 | * | 8/2012 | .......... B41M 7/0045 |
| JP | S52104527 A | | 9/1977 | |
| JP | 0764657 B2 | * | 7/1995 | |
| JP | h0764657 B2 | * | 7/1995 | |
| JP | 2008013402 A | * | 1/2008 | .......... C04B 41/009 |
| JP | 2014070138 A | * | 4/2014 | |
| JP | 2020147036 A | * | 9/2020 | |

* cited by examiner

*Primary Examiner* — Ha S Nguyen

(57) ABSTRACT

The present disclosure discloses a modified calcium silicate board, and belongs to the technical field of floors and decorative boards. A modification method comprises steps of: dipping a calcium silicate board in a silicon dioxide solution with a solid content of 95% or more, completely absorbing the silicon dioxide solution until the calcium silicate board is saturated, and drying the dipped calcium silicate board; and carrying out sizing hardening on any surface of the modified calcium silicate board to obtain the calcium silicate board, so as to enable the triamine impregnated paper to be directly laminated with the calcium silicate board in a hot-pressing manner, and enable the surface bonding strength to reach 1 MPa; wood veneers, fireproof plates and other materials are subjected to coldbonding, the peeling strength of the product meets the requirements, and the practicability of the calcium silicate board is effectively improved.

7 Claims, No Drawings

MODIFIED CALCIUM SILICATE BOARD AND SURFACE TREATMENT METHOD AND APPLICATION THEREOF

TECHNICAL FIELD

The present disclosure belongs to the technical field of floors and decorative boards, and particularly relates to the preparation technology of composite decorative boards.

BACKGROUND

With the improvement of people's living standards, the requirements for environmental protection, flame retardancy, and aesthetics of decorative materials become higher and higher. Calcium silicate board is a novel decorative material, and its advantages such as stability, flame retardancy, formaldehyde-free, and low cost are more and more catering to the market demands.

However, the known calcium silicate boards are mostly made of powders of inorganic materials such as calcium silicate or calcium carbonate. In more detail, the known calcium silicate boards are made of silicic acid and calcareous as the main components through pulping, sheet-forming, steam curing and other processes; or they are made of fibers such as cement, silica sand, and asbestos as the main components, added with additives, and compressed by sheet-forming or pulping process under high-pressure steam curing. Most of the prepared calcium silicate boards are calcium silicate crystalline powder due to being formed by reactive crystallization under high temperature and high pressure. However, due to a weak binding force between calcium silicate crystal powders, the powder closer to the surface material is easily torn and peeled off by the surface material when a surface material is to be attached to the surface of this type of calcium silicate board, so that it is difficult to firmly attach the surface material to the calcium silicate board, that is, the surface material is fairly easy to peel off. The reason is that the structure of the calcium silicate board is loose, and the binding force between powders is less than that of viscose, so that the pulling force is directly transmitted to the powder closer to the surface material, resulting in the surface material to be easily peeled off with the powder closer to the surface material, which becomes a difficulty in construction.

The Chinese patent for invention with Publication No. CN105859323A discloses a method for processing a surface layer of a calcium silicate plate, comprising the following steps: (1) preparing a calcium silicate plate; wherein the calcium silicate plate has a first surface and a second surface which are opposite; (2) coating a water glass solution for first time: coating or spraying the water glass solution with weight percentage concentration being a on the first surface of the calcium silicate plate, permeating the water glass solution into the calcium silicate plate for a predetermined thickness; and (3) coating the water glass solution for second time: coating or spraying the water glass solution with weight percentage concentration being b on the first surface of the calcium silicate plate, permeating the water glass solution into the calcium silicate plate for the predetermined thickness; wherein, a is less than b, and a and b are respectively greater than 30% but less than 55%. This technical solution can make the surface structure of the calcium silicate board compact and easy to attach to the surface material, so that the surface material can be firmly attached to the calcium silicate board without peeling, which is also a modification method for the calcium silicate board, but is only to apply a simply water glass coating on the bonding surface that needs to be bonded to the surface material, so that the water glass is immersed into the surface of the calcium silicate board, where the calcium silicate board with length and width of 2400 mm and 1200 mm is only applied with 50 g to 60 g of the water glass. The depth of entry only stays in the shallow surface layer, which can only prevent primary peeling, and still cannot meet the demand for anti-peeling and bending-resistant calcium silicate boards currently on the market. It is also found that the calcium silicate board treated by this surface treatment method is completely inadhesive to the triamine impregnated paper under hot pressing.

SUMMARY

Viewing the shortcomings in the prior art, the present disclosure provides a modified calcium silicate board that can integrally strengthen the structure and compactness of the calcium silicate board and is convenient to compound with various surface materials and a surface treatment method thereof, to enable triamine impregnated paper to be directly laminated with the calcium silicate board and enable the surface bonding strength to reach 1 MPa; wood veneers, fireproof plates and other materials are subjected to cold-bonding, the peeling strength of the product meets the requirements, and the practicability of the calcium silicate board is effectively improved.

In order to achieve an object of the present disclosure, the following technical solution is provided: a modified calcium silicate board is obtained by a modification method comprising steps of: dipping a calcium silicate board in a silicon dioxide solution with a solid content of 95% or more, completely absorbing the silicon dioxide solution until the calcium silicate board is saturated, and drying the dipped calcium silicate board. The modification of the calcium silicate board by completely impregnating the calcium silicate board improves the internal bonding strength of the calcium silicate board compared with the modification of applying a coating only on the surface in the prior art.

Further, a mass of silica absorbed by the calcium silicate board fully absorbed to saturation is 25 to 40 kg per cubic meter.

A surface treatment method of the modified calcium silicate board comprises carrying out sizing hardening on any surface of the modified calcium silicate board, where the sizing hardening comprises gluing and penetration, drying, cooling and polishing.

Preferably, the sizing hardening is particularly as follows:
(1) a first sizing: a primary gluing, a primary leveling and penetration, a primary drying, a primary cooling and a primary polishing; and
(2) a second sizing carried out on the first sized surface: a secondary gluing, a second drying and a second polishing.

Preferably, an amount of glue applied for the primary gluing in the first sizing is: when the modified calcium silicate board has a board density of 900 to 950 kg/m$^3$, the amount of glue is 110 to 120 g/m$^2$; when the modified calcium silicate board has a board density of 950 to 1100 kg/m$^3$, the amount of glue is 90 to 100 g/m$^2$; when the modified calcium silicate board has a board density of 1100 to 1300 kg/m$^3$, the amount of glue is 75 to 85 g/m$^2$.

Preferably, the primary gluing adopts a waterborne two-component epoxy glue with better applicability to the calcium silicate board.

Preferably, the first drying enters a drying tunnel at a speed of 10 to 12 m/min, and the drying tunnel is set at a temperature of 130 to 150° C., with a length of 10 to 15 m. Preferably, an amount of glue applied for the secondary gluing in the first sizing is 40 to 50 g/m$^2$.

Preferably, the secondary drying enters a drying tunnel at a speed of 8 to 10 m/min, and the drying tunnel is set at a temperature of 130 to 150° C., with a length of 10 to 15 m.

Preferably, the secondary gluing adopts a waterborne acrylic glue and a curing agent isocyanate, where a weight ratio of the waterborne acrylic adhesive to the isocyanate is 3.5 to 10:1, and an optimal ratio of the waterborne acrylic adhesive to the isocyanate is 6 to 7:1, at which the strength is the highest, convenient for mass production.

In order to achieve an object of the present disclosure, the present disclosure provides an application of a modified calcium silicate board with surface treatment, where a surface material is attached to any surface of the modified calcium silicate.

Preferably, the surface material comprises triamine impregnated paper, wood veneers and fireproof plates.

Preferably, a method for attaching the surface material comprises high-temperature hot pressing and cold pressing.

Advantageous Effects

1. The modification of the calcium silicate board improves the internal bonding strength of the calcium silicate board.

2. The modified calcium silicate board can be composited with other surface materials by gluing processing the surface of the modified calcium silicate board, which enables triamine impregnated paper to be directly laminated with the calcium silicate board and enables the surface bonding strength to reach 1 MPa; wood veneers, fireproof plates and other materials are subjected to coldbonding, the peeling strength of the product meets the requirements, and the practicability of the calcium silicate board is effectively improved, so that the present disclosure has a much broader range of applicability.

3. The final product after attaching the surface material reduces the consumption cost and is environment-friendly and non-toxic.

DETAILED DESCRIPTION OF THE EMBODIMENTS

Example 1

A modified calcium silicate board was obtained by a modification method comprising steps of: dipping a calcium silicate board in a silicon dioxide solution with a solid content of 95% or more, completely absorbing the silicon dioxide solution until the calcium silicate board is saturated, and drying the dipped calcium silicate board.

Internal binding forces of the calcium silicate board prior to modification and the modified calcium silicate board were tested, respectively, where the internal binding force of the calcium silicate board prior to modification was 40 kg/f, and that of the modified calcium silicate board was 70 kg/f.

Example 2

The modified calcium silicate board in example 1 was subjected to surface treatment, that is, sizing hardening was performed on any surface of the modified calcium silicate board:

(1) A first sizing included a primary gluing, a primary leveling and penetration, a primary drying, a primary cooling and a primary polishing, where an amount of glue applied for the primary gluing in the first sizing was 120 g/m$^2$ when the modified calcium silicate board had a board density of 910 kg/m$^3$, the primary gluing adopted a waterborne two-component epoxy glue, the primary drying entered a drying tunnel at a speed of 10 to 12 m/min, and the drying tunnel was set at a temperature of 130 to 150° C., with a length of 10 to 15 m.

(2) A second sizing carried out on the first sized surface included a secondary gluing, a second drying and a second polishing, where an amount of glue applied for the secondary gluing was 40 g/m$^2$, the secondary drying entered a drying tunnel at a speed of 8 m/min, and the drying tunnel was set at a temperature of 150° C., with a length of 10 m. The secondary gluing adopts a waterborne acrylic glue and a curing agent isocyanate, where a weight ratio of the waterborne acrylic adhesive to the isocyanate is 3.5 to 1.

Examples 3-7

The specific method for surface treatment of the modified calcium silicate board was the same as in Example 2, and the specific parameter control of the first sizing and the second sizing was shown in Table 1.

TABLE 1

| | A first sizing | | | | |
|---|---|---|---|---|---|
| | Density of the modified calcium silicate | Amount of glue (g/m$^2$) | Speed of entering drying tunnel (m/min) | Temperature of drying tunnel (° C.) | Length of drying tunnel (M) |
| Example 2 | 910 | 120 | 10 | 150 | 10 |
| Example 3 | 950 | 110 | 10 | 150 | 10 |
| Example 4 | 1000 | 100 | 11 | 140 | 12 |
| Example 5 | 1100 | 90 | 11 | 140 | 12 |
| Example 6 | 1200 | 85 | 12 | 130 | 15 |
| Example 7 | 1300 | 75 | 12 | 130 | 15 |

| | A second sizing | | | | |
|---|---|---|---|---|---|
| | Amount of glue (g/m$^2$) | Speed of entering drying tunnel (m/min) | Temperature of drying tunnel (° C.) | Length of drying tunnel (M) | waterborne acrylic glue: isocyanate |
| Example 2 | 40 | 8 | 150 | 10 | 3.5 |
| Example 3 | 40 | 8 | 150 | 10 | 6 |
| Example 4 | 45 | 9 | 140 | 12 | 6 |
| Example 5 | 45 | 9 | 140 | 12 | 7 |
| Example 6 | 50 | 10 | 130 | 15 | 7 |
| Example 7 | 50 | 10 | 130 | 15 | 10 |

Examples 8-16

The surface material was attached to the calcium silicate board after surface treatment in the above Examples 2-7, and the peel strength of the final product was tested, as shown in Table 2.

TABLE 2

| | Calcium silicate board | Surface material | Attaching method | Peel strength (Mpa) |
|---|---|---|---|---|
| Example 8 | Example 1 | triamine impregnated paper | High temperature and hot pressing (a single surface) | Not adhere firmly |
| Example 9 | Example 2 | triamine impregnated paper | High temperature and hot pressing (a single surface) | 1 |
| Example 10 | Example 3 | triamine impregnated paper | High temperature and hot pressing (a single surface) | 1.2 |
| Example 11 | Example 1 | wood veneers (with Pur glue) | Cold pressing (dual-surface) | 0.4 |
| Example 12 | Example 4 | wood veneers (with Pur glue) | Cold pressing (dual-surface) | 1.4 |
| Example 13 | Example 5 | wood veneers | Cold pressing (dual-surface) | 1.7 |
| Example 14 | Example 1 | fireproof plates (with Pur glue) | Cold pressing (a single surface) | 0.5 |
| Example 15 | Example 6 | fireproof plates (with Pur glue) | Cold pressing (a single surface) | 1.1 |
| Example 16 | Example 7 | fireproof plates (with Pur glue) | Cold pressing (a single surface) | 1.6 |

What is claimed is:

1. A surface treatment method of a modified calcium silicate board, comprising:
   dipping a calcium silicate board in a silicon dioxide solution with a solid content of 95% or more, completely absorbing the silicon dioxide solution until the calcium silicate board is saturated, and drying the dipped calcium silicate board; and
   carrying out sizing hardening on any surface of the modified calcium silicate board, wherein the sizing hardening comprises gluing, leveling and penetration, drying, cooling and polishing;
   wherein the sizing hardening comprises:
   (1) a first sizing: a primary gluing, a primary leveling and penetration, a primary drying, a primary cooling and a primary polishing; and
   (2) a second sizing carried out on the first sized surface: a secondary gluing, a second drying and a second polishing;
   wherein the secondary gluing adopts a waterborne acrylic glue and a curing agent isocyanate, and a weight ratio of the waterborne acrylic glue to the isocyanate is 3.5 to 10:1.

2. The surface treatment method of the modified calcium silicate board according to claim 1, wherein an amount of glue applied for the primary gluing in the first sizing is: when the modified calcium silicate board has a board density of 900 to 950 kg/m$^3$, the amount of glue is 110 to 120 g/m$^2$; when the modified calcium silicate board has a board density of 950 to 1100 kg/m$^3$, the amount of glue is 90 to 100 g/m$^2$; when the modified calcium silicate board has a board density of 1100 to 1300 kg/m$^3$, the amount of glue is 75 to 85 g/m$^2$; the primary gluing adopts a waterborne two-component epoxy glue with better applicability to the calcium silicate board; the primary drying enters a drying tunnel at a speed of 10 to 12 m/min, and the drying tunnel is set at a temperature of 130 to 150° C., with a length of 10 to 15 m.

3. The surface treatment method of the modified calcium silicate board according to claim 1, wherein an amount of glue for the secondary gluing is 40 to 50 g/m$^2$.

4. The surface treatment method of the modified calcium silicate board according to claim 1, wherein the secondary drying enters a drying tunnel at a speed of 8 to 10 m/min, the drying tunnel is set at a temperature of 130 to 150° C., and the drying tunnel has a length of 10 to 15 m.

5. The surface treatment method of the modified calcium silicate board according to claim 1, wherein the weight ratio of the waterborne acrylic glue to the isocyanate is 6 to 7:1.

6. A modified calcium silicate board composite material, comprising the modified calcium silicate board after surface treatment according to claim 1, and a surface material pasted on any surface of the calcium silicate board.

7. The composite material according to claim 6, wherein the surface material comprises triamine impregnated paper, wood veneers and fireproof plates, and a method for attaching the surface material comprises high-temperature hot pressing and cold pressing.

* * * * *